United States Patent [19]
Darcie

[11] Patent Number: 5,546,485
[45] Date of Patent: Aug. 13, 1996

[54] REPEATER FOR SOLITON TRANSMISSION SYSTEM USING SLIDING-FREQUENCY GUIDING FILTER

[75] Inventor: Janet M. Darcie, Middletown, N.J.

[73] Assignee: AT&T Corp., Murray Hill, N.J.

[21] Appl. No.: 170,624

[22] Filed: Dec. 20, 1993

[51] Int. Cl.$^6$ .................................................... G02B 6/28
[52] U.S. Cl. .............................. 385/28; 359/179; 385/24; 385/96
[58] Field of Search .................................. 385/24, 27–30, 385/39, 50, 51, 96, 98; 359/173, 179, 188, 195

[56] References Cited

U.S. PATENT DOCUMENTS

| | | | |
|---|---|---|---|
| 4,229,067 | 10/1980 | Love | 385/28 |
| 4,976,512 | 12/1990 | Safaai-Jazi | 385/30 |
| 5,140,656 | 8/1992 | Hasegawa et al. | 385/24 |
| 5,301,252 | 4/1994 | Yanagawa et al. | 385/96 |
| 5,357,364 | 10/1994 | Gordon et al. | 359/173 |

FOREIGN PATENT DOCUMENTS

| | | | |
|---|---|---|---|
| 52-32341 | 3/1977 | Japan | 385/29 |

OTHER PUBLICATIONS

L. F. Mollenauer, et al., "The sliding–Frequency guiding filter: an improved form of soliton jitter control", Optics Letters, vol. 17, No. 22, Nov. 15, 1992, pp. 1575–1577.

L. F. Mollenauer et al., "Demonstration, Using Sliding–Frequency Guiding Filters of Error–Free Soliton Transmission Over more Than 20 Mm. at 10 Gbit/s", Single et al., Electronics Letters, May 13, 1993, pp. 910, 911, vol. 29, No. 10.

B. Y. Kim et al., "Use of highly elliptical core fibers for two–mode fiber devices", Optics Letters, vol. 12, (Sep.) 1987, pp. 729–731.

*Primary Examiner*—John D. Lee

[57] ABSTRACT

A sliding-frequency guiding filter for use in the repeater of a soliton transmission system is disclosed. The filter is joined to the output of a soliton amplifier by a fusion splice and consists of a single mode fiber pigtail joined by a fusion splice to each end of an elliptical core fiber having a length L, defined by the following equation:

$$L_{FSR}=(1/\Delta n)[(\lambda^2/FSR)-\lambda]$$

where FSR is the free spectral range of the filter, $\lambda$ is the wavelength of the fundamental mode in the system, and $\Delta n$ is the difference between the index of refraction for the fundamental mode and the index of refraction for a higher order mode in the fiber of length L. Since the length, L, is difficult to obtain at the level of precision required, the filters are first measured in order to determine the frequencies of their attenuation peaks and then placed into bins in accordance with the measured wavelength of the attenuation peak. The filters are then selected for placement in a repeater in accordance with the position of the repeater in the system.

8 Claims, 1 Drawing Sheet

REPEATER FOR SOLITON TRANSMISSION SYSTEM USING SLIDING-FREQUENCY GUIDING FILTER

FIELD OF THE INVENTION

This invention relates to lightwave soliton transmission systems and, more particularly to repeaters used therein which include optical filters positioned at specific locations along the length of the transmission medium.

DESCRIPTION OF THE RELATED ART

Soliton transmission systems can potentially provide exceedingly high information transmission capacity over long distances. In ultra-long distance systems such as transcontinental and transoceanic systems, optical amplifiers periodically boost the power of propagating information-bearing soliton pulses sufficiently high to compensate for losses experienced in the fiber transmission medium. Unfortunately for ultra-long distance systems, however, the maximum information bit rate for a single channel is set by the amount of jitter in pulse arrival times generated by two different effects. One is the Gordon-Haus effect and the other is an acoustic interaction effect.

The Gordon-Haus effect is occasioned by the interaction of soliton pulses with amplifier spontaneous emission noise present along the transmission medium. J. P. Gordon et al. describe this effect in *Optic Letters*, Vol. 11, No. 10, pp. 665–7 (1986). Amplifier spontaneous emission noise alters both the amplitude and carrier or channel frequency of the soliton pulses at random resulting in a jitter in pulse arrival times. Pulse jitter can cause a soliton pulse to walk off into the time interval reserved for a neighboring soliton pulse. The result, often known as intersymbol interference, is an error in the received information.

Guiding filters can be used in soliton transmission systems to reduce jitter and accumulation of noise. See the articles by Y. Kodama et al. in *Optics Letters*, Vol. 17, No. 1, pp. 31–3 (1992) and by A. Mecozzi et al. in *Optics Letters*, Vol. 16, No. 23, pp. 1841–3 (1991). These references propose the use of linear narrow-band filters ("frequency guiding filters") spaced at predetermined intervals along the transmission fiber. Each filter, in essence, shapes the frequency dependent gain characteristic of the corresponding amplifier. The linear filters are effectively identical within manufacturing tolerances in that each filter exhibits a center frequency substantially equal to the soliton center frequency. However, the introduction of filters causes additional soliton pulse energy loss which, in turn, must be offset by higher gain from the optical amplifiers. This higher gain, however, results in an exponential increase with distance of those spectral components of the noise at or near the filter response peak. As a result, the maximum useable filter strength is limited as is the realizable jitter reduction. A recent experiment using the frequency guiding filters was reported by L. Mollenauer et al. in *Electronics Letters*, Vol. 28, p. 792 (1992) for a 10,000 km soliton transmission system in which the filter achieving the lowest bit error rate caused a 50% reduction in the standard deviation of the timing jitter.

Further improvement in the reduction of noise and accumulation of jitter can be achieved if the filter peak is also translated along the length of the system. This has given rise to the term "sliding-frequency guiding filter". See the copending U.S. patent application entitled "Soliton Transmission System Having Sliding-Frequency Guiding Filters", by J. P. Gordon et al., Ser. No. 07/904239 (now U.S. Pat. No. 5,357,364). Also see the article entitled "The sliding-frequency guiding filter: an improved from of soliton control", by L. F. Mollenauer et al., *Optics Letters*, Vol. 17, No. 22, Nov. 15, 1992, pages 1575–1577. Systems of this type will be especially useful in an undersea environment. If filters are to be used in this environment however, they should have low polarization dependent loss, low polarization mode dispersion, low temperature sensitivity and high reliability. The problem with filters that have been suggested thus far in the prior art is that they do not meet the attributes required for undersea systems, and the complexity of the suggested filters implies a high filter cost or development cost, or both. For example, Fabry-Perot filters in fiber exhibit a poor return loss. Mach-Zehnder type filters have an unacceptable temperature sensitivity because of the path length difference in both arms. Other filters are available, but none stand out as meeting the requirements of soliton systems and undersea constraints. Hence, the sliding-frequency guiding filter is a critical component of soliton systems that could inhibit their development and product realization.

SUMMARY OF THE INVENTION

A sliding-frequency guiding filter and a repeater for use in a soliton transmission system are provided in accordance with the present invention wherein the sliding-frequency filter is fabricated from a predetermined length of optical fiber having specifically defined optical characteristics with a single mode fiber pigtail connected to each of its ends by a fusion splice. The present invention is based on the discovery that modal noise introduced by a fusion splice can be used to produce the desired characteristic for a sliding-frequency guiding filter. When the fundamental mode in a single mode fiber system reaches the first splice, a higher order mode is excited. By using a fiber between the two splices with a higher cutoff wavelength, a sufficient amount of the higher order mode is present at the second of the two spices such that a fraction of the excited power is coupled back to the fundamental mode thereby providing a low finesse filter with a ripple characteristic of the type required for a sliding-frequency guiding filter.

It has also been discovered that the change in length of the fiber between the splices required to produce the desired absolute wavelength positions of the peaks of the filter is much too small to simply cut a length of fiber that can be fusion spliced into the repeater of a soliton transmission system. However, the period of the filter is simple to set within the desired tolerances. The filter constricted in accordance with the present invention must also have a pigtail section of single mode fiber attached to each end of the predetermined length of optical fiber. To construct a repeater which uses the present invention, a plurality of optical filters with pigtails are fabricated, their loss characteristics are measured, and they are placed into bins in accordance with the wavelength position of their loss peaks. The filters are then selected from the bins during the manufacture of the repeaters in accordance with the position of the repeater in the soliton system in order to provide the desired sliding-frequency guiding characteristic.

DESCRIPTION OF THE PREFERRED EMBODIMENT

Figure 1:
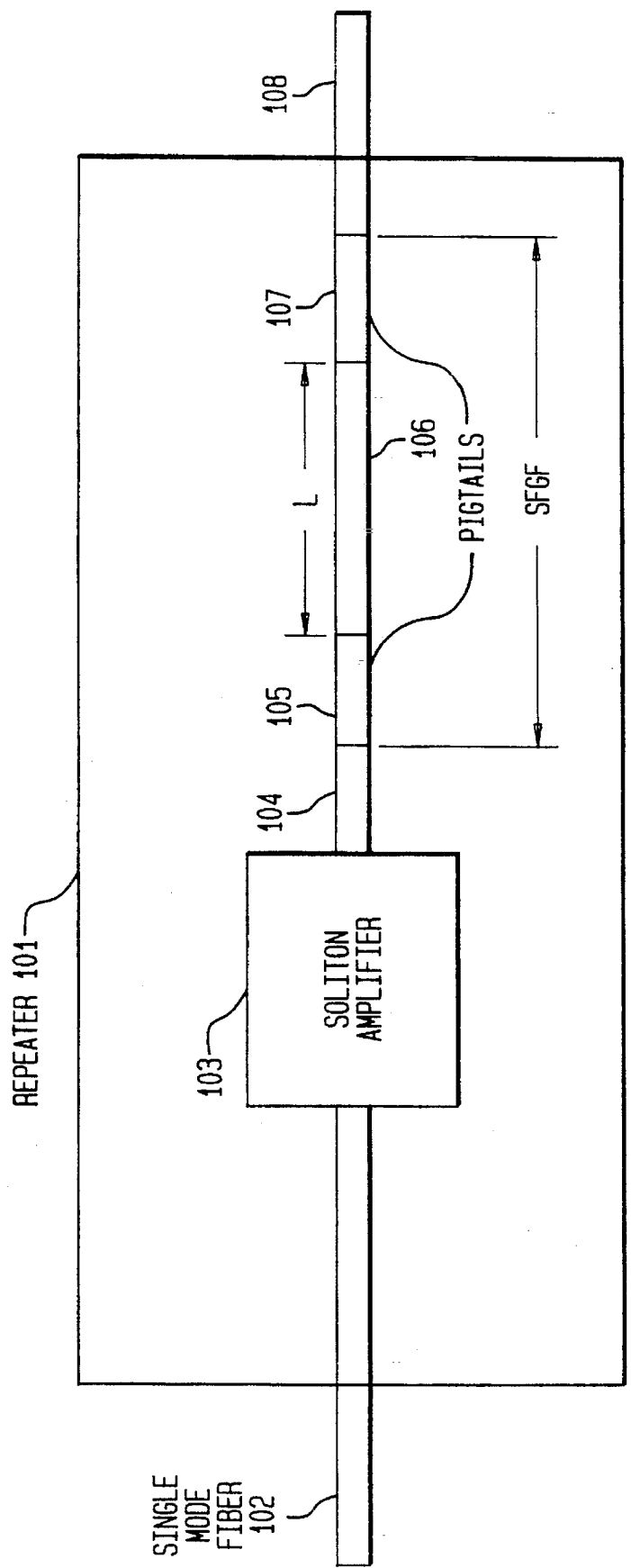
FIG. 1 is diagram of an soliton optical repeater with a sliding-frequency filter constructed in accordance with the present invention.

In FIG. 1, a repeater 101 has its input connected to a single mode fiber 102 and its output connected to single mode fiber 108 in order to amplify the soliton pulses in a soliton optical transmission system. The embodiment as shown in FIG. 1 is in the simplified form of unidirectional transmission. In addition the numerous details of connecting into and out of such a repeater are also not shown in order to simplify the explanation of the invention. For example, in most soliton repeaters there is also an isolator at the repeater output. Furthermore, the fundamental principles of the present invention are described in terms of a single channel or single frequency soliton system, but the principles of the present invention are extendible to frequency-division-multiplexed systems utilizing a plurality of different soliton frequency channels. The soliton pulses present on fiber 102 are amplified within repeater 101 by a soliton amplifier 103 which comprises an optically pumped section of rare earth doped optical fiber to provide gain to pulses propagating at the soliton center frequency. A single mode fiber 104 at the output of amplifier 103 is followed by a sliding-frequency guiding filter constructed in three sections as follows: (1) a pigtail 105 made of a single mode fiber substantially identical to fiber 104; (2) a length, L, of fiber 106 carefully selected in accordance with the criteria set forth hereinbelow; and (3) a pigtail 107 made of fiber substantially identical to the fiber 108. All of the fibers, 104–108 are joined by fusion splices.

In brief, a higher order mode (HOM) is excited at the fusion splice between fibers 105 and 106. That HOM propagates through fiber 106, which has a higher cutoff wavelength than the single mode fiber, and is coupled back into the fundamental mode at the splice between fibers 106 and 107. A low-finesse filter results from the beat between the signal propagated in the fundamental mode and the signal propagated in the HOM mode thereby providing a sliding-frequency filter.

Modal noise is the result of interference effects between propagating modes at discontinuities. The foundation of the present invention is based on a study of the modal noise which results from higher mode excitation at a splice that is separated from a second splice by a short predetermined length (L) of carefully selected fiber. In a single mode fiber system, all but the degenerate fundamental $LP_{01}$ mode is strongly attenuated. When this mode reaches the first splice, much of the splice loss can be attributed to excitation of higher-order modes, usually the $LP_{11}$ mode. If the length, L, is sufficiently short, a fraction of the excited power can be coupled back to the fundamental mode at the second splice.

The normalized optical intensity, I, of the fundamental mode after the second splice can be approximated by the following equation assuming low splice losses:

$$I \cong 1 + A \cos\left[(2\pi/\lambda)(n_{11} - n_{01})L\right] \quad (1)$$

where $\lambda$ is the wavelength of the fundamental mode, $n_{11}$ is the index of refraction for the $LP_{11}$ mode, $n_{01}$ is the index of refraction for the $LP_{01}$ mode, L is the length of fiber between the two splices, and A is a function which can be represented by the following equation:

$$A = 2e^{-\alpha_{11} L/2}(1 - K_{11}) K_{11} F(\overline{P}_s, \overline{P}_d) \quad (2)$$

where $\alpha_{11}$ is the attenuation of the $LP_{11}$ mode, $K_{11}$ represents the loss of the fundamental signal to the $LP_{11}$ mode, and $F(\overline{P}_s, \overline{P}_d) = \cos v$, where $2v$ is the angle subtended at the center of the Pointcare sphere by the 2 output states of polarization. The above equation (1) will be recognized by those skilled in the art as the equation for a low finesse filter with a ripple proportional to the coefficient, A, and a period (or Free Spectral Range) that depends on $(n_{11} - n_{01})L = \Delta nL$, assuming A is smaller than one. If the splice loss due to excitation into the $LP_{11}$ mode is 0.11 dB, the peak to peal ripple provided by A is approximately 0.4 dB for fibers that exhibit an insignificant attenuation of the $LP_{11}$ mode. This value of ripple is compatible with the requirements for the sliding-frequency guiding filter (SFGF). The other desired attribute for the SFGF is a Free Spectral Range (FSR) of about 8 Å. The length required to achieve a given FSR at any given wavelength $\lambda$ can be derived from equation (1) for a $2\pi$ shift.

$$L_{2\pi} = (1/\Delta n)[(\lambda^2/FSR) - \lambda] \quad (3)$$

where $\Delta n$ is equal to $(n_{11} - n_{01})$, and FSR is the free spectral range or wavelength distance between adjacent attenuation peaks. For a single mode fiber where the $LP_{11}$ mode would be operating far above cutoff, $\Delta n$ is simply the difference between the index of refraction of the core and the index of refraction of the cladding. For fibers that operate near or above cutoff, $\Delta n$ is determined by the mode beat length, a quantity which can be measured. The mode beat length is equal to $2\pi/\Delta\beta$, where $\Delta\beta$ is the difference in the propagation constants of the two modes. By substituting the value of $\Delta\beta$ in terms of the wavelength and $\Delta n$, beat length is also equal to the wavelength, $\lambda$, divided by the $\{n_{11} - n_{01}\}$, the absolute value of the difference of the index of refraction of the two modes. Consequently, the $\Delta n$ can be specified by the following equation:

$$\Delta n = \lambda/(\text{beat length}) \quad (4)$$

See the following articles for a description of techniques that can be used to measure the beat length of two modes in a fiber: "Fiber-Optic Modal Coupler Using Periodic Microbending", by J. N. Blake et al., *Optics Letters*, Vol. 11, 1986, pages 177–179; and "Phase Velocity Measurement Using Prism Output Coupling for Single- and Few-Mode Optical Fibers", by W. V. Sorin et al., *Optics letters*, Vol. 11, 1986, pages 106–108.

From the theoretical analysis, several criteria for the optimal fiber design can be specified. The fiber between the splices, should have a higher cutoff wavelength in order to assure survival of the higher order mode (HOM) to the second splice and a low attenuation coefficient for this HOM. The fiber should have a large $\Delta n$ thereby resulting in a short fiber length as indicated by equation (3). This latter criteria must be balanced with polarization considerations. The fiber should have low birefringence and low intra-fiber mode coupling in order to insure filter stability. It should also have low splice polarization dependent loss and low polarization dependence of the intra-fiber coupling to ensure filter stability over changing input polarization states. Finally, it should have low temperature-dependent intra-fiber coupling and temperature insensitive $\Delta n$.

In the specific embodiment which was constructed, a 2-mode, elliptical core fiber of the type currently in use in dispersion equalizers was chosen. This fiber is attractive for the SFGF because of its high cutoff wavelength, high numerical aperture, and low coupling from the $LP_{11}$ mode back into the $LP_{01}$ along the length of the fiber. By measuring the beat length for fiber under consideration, equation (4) can be used in order to compute the value of $\Delta n$. Using this computed value of $\Delta n$, equation (3) can then be used in order to compute the precise length which is required in order to provide a FSR of 8 Å. For the elliptical fiber which was used in the specific embodiment, $\Delta n$ was computed to be about 0.026, and for a wavelength of 1551 nm the FSR length was determined to be 11.6 cm.

The FSR is not very sensitive with respect to changes in the length of the fiber, but unfortunately, small changes in the physical length of the fiber 106 can result in a $2\pi$ shift in the absolute wavelength peaks of the filter. For example, for the elliptical core fiber chosen for the specific embodiment and having a $\Delta n$ of 0.026, a change length of only 120 µm results in a peak wavelength shift over the full FSR. Since the required fiber lengths would be difficult to obtain at this level of precision, a binning process is required in building repeaters with these sliding-frequency guiding filters. This is the reason that pigtails 105 and 107 are a necessary part of the invention. In the construction of the repeaters, a plurality of fibers 106 are first cut to the length specified by equation (3). These fibers are then joined to their respective pigtails 105 and 107 by fusion splices. The fabricated sliding-frequency guiding filters are then measured and placed in bins depending on where there peaks reside in the frequency spectrum. The absolute wavelength peaks would follow a uniform probability distribution over the device FSR. In the construction of the repeaters, the SFGFs would then be chosen in accordance with expected position of the repeater in the soliton system. The first group of repeaters would have their SFGFs selected from bin 1, the next group of repeaters from bin 2, and so on, until the last group of repeaters have their SFGFs selected from the last bin. It is expected that a grouping of about 8 bins could provide the type of SFGF action required to effectively reduce pulse jitter in a long distance soliton transmission system.

What has been described hereinabove is merely an illustrative embodiment of the present invention. Numerous departures may be made by those skilled in the art without departing from the spirit and scope of the present invention. For example, since it is the splices that produce the desired filter action, many different types of fiber may be used in the construction of the second section. The only major criteria is that the length of that section be equal to that which is required to provide the proper FSR needed for sliding-frequency guiding filter action. Even a fiber that does not have a higher cutoff wavelength than the single mode pigtails may be acceptable providing the attenuation encountered by the HOM is sufficiently small.

In addition, this proposed filter design can also be used as a gain equalization filter in multiwavelength optical systems, where the shape of the filter spectrum would be used to counteract the spectral shaping of the amplifier such that the net result is approximately equal powers over all wavelength channels. In this case the length of the second section is adjusted to achieve the desired transfer function within the wavelengths of interest. This form of gain equalization is especially useful in repeaters for wavelength division multiplexing systems.

What is claimed is:

1. An optical fiber modal filter having a ripple attenuation characteristic with a free spectral range (FSR) useful in a transmission system with a fundamental wavelength of $\lambda$, said filter comprising a first pigtail section of single mode optical fiber having a cutoff wavelength such that only the fundamental mode is propagated with minimal attenuation, a second section of optical fiber having one end connected by a fusion splice to said first section and having a length, L, which is approximately defined by the following equation:

$$L_{FSR}=(1/\Delta n) [(\lambda^2/FSR)-\lambda]$$

where $\Delta n$ is equal to the difference between index of refraction of said fundamental mode and the index of refraction for a higher order mode in said second section, and a third pigtail section connected by a fusion splice to the other end of said second section and having a cutoff wavelength such that only the fundamental mode is propagated with minimal attenuation.

2. An optical fiber modal filter as defined in claim 1 wherein said second section of optical fiber has a higher cutoff wavelength than said single mode fiber.

3. An optical fiber modal filter as defined in claim 2 wherein said second section of optical fiber is an elliptical core fiber.

4. A repeater for use in a transmission system for soliton pulses comprising an optical amplifier means having an input adapted to receive said soliton pulses and an output for providing amplified soliton pulses on a single mode fiber, a sliding-frequency guiding filter connected to the output single mode fiber at the output of said optical amplifier means to reduce jitter in said soliton pulses, characterized in that said filter includes a first pigtail section of single mode optical fiber having a cutoff wavelength such that only a fundamental mode is propagated with minimal attenuation, a second section of optical fiber connected at one end by a fusion splice to said first section and having a higher cutoff wavelength than said first section such that modes higher than said fundamental mode can be propagated with minimal attenuation, and a third pigtail section connected by a fusion splice to the other end of said second section and having a cutoff wavelength such that only a fundamental mode is propagated with minimal attenuation.

5. A repeater as defined in claim 4 wherein said second section of optical fiber is an elliptical core fiber.

6. A repeater for use in a transmission system for soliton pulses, said repeater comprising an optical amplifier means having an input adapted to receive said soliton pulses and an output for providing amplified soliton pulses on a single mode fiber, a sliding-frequency guiding filter having a free spectral range (FSR) and connected to the single mode fiber at the output of said optical amplifier means to reduce jitter in said soliton pulses, characterized in that said filter includes a first pigtail section of single mode optical fiber having a cutoff wavelength such that only a fundamental mode at a wavelength $\lambda$ is propagated with minimal attenuation, a second section of optical fiber having one end connected by a fusion splice to said first section and having a length, L, which is approximately defined by the following equation:

$$L_{FSR}=(1/\Delta n) [(\lambda^2/FSR)-\lambda]$$

where $\Delta n$ is equal to the difference between the index of refraction of said fundamental mode and the index of refraction for a higher order mode in said second section, and a third pigtail section connected by a fusion splice to the other end of said second section and having a cutoff wavelength such that only a fundamental node at a wavelength $\lambda$ is propagated with minimal attenuation.

7. A repeater as defined in claim 6 wherein said second section of optical fiber has a higher cutoff wavelength than said first section of single mode optical fiber.

8. A repeater as defined in claim 7 wherein said second section of optical fiber is an elliptical core fiber.

* * * * *